United States Patent
Yamada et al.

(10) Patent No.: US 6,557,411 B1
(45) Date of Patent: May 6, 2003

(54) HEATING ELEMENT TYPE MASS AIR FLOW SENSOR, AND INTERNAL COMBUSTION ENGINE-CONTROL APPARATUS USING THE SENSOR

(75) Inventors: Masamichi Yamada, Hitachinaka (JP); Izumi Watanabe, Hitachinaka (JP); Keiichi Nakada, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/626,915

(22) Filed: Jul. 27, 2000

(30) Foreign Application Priority Data

Jul. 27, 1999 (JP) .......................................... 11-212447

(51) Int. Cl.⁷ ................................................ G01F 1/68
(52) U.S. Cl. ................................................... 73/204.26
(58) Field of Search .......................... 73/204.26, 204.25, 73/204.24, 202, 202.5

(56) References Cited

U.S. PATENT DOCUMENTS 5,050,429 A * 9/1991 Nishimoto et al. ...... 73/204.26
5,291,781 A * 3/1994 Nagata et al. ........... 73/204.26
5,393,351 A * 2/1995 Kinard et al. ................ 136/225
5,936,157 A * 8/1999 Yamashita et al. ....... 73/204.26
6,357,294 B1 * 3/2002 Nakada et al. ........... 73/204.26

FOREIGN PATENT DOCUMENTS

| JP | 4-158263 | 6/1992 |
| JP | 10-253414 | 9/1998 |

* cited by examiner

*Primary Examiner*—Hezron Williams
*Assistant Examiner*—Corey D. Mack
(74) *Attorney, Agent, or Firm*—Crowell & Moring LLP

(57) ABSTRACT

A heating element type mass flow sensor has a composition such that a heating resistor is located substantially in a straight line in the direction perpendicular to the air flow direction; at least a pair of resistance temperature-sensing elements are separately arranged upstream and downstream of the heating resistor, respectively; the heating resistors and the resistance temperature-sensing elements are symmetrically arranged with respect to the air flow direction (the x direction) and the direction perpendicular to the air flow (the y direction), that is, in the two-rotation symmetric manner; and slits are shaped in the respective regions near the two end sides of the heating resistor.

16 Claims, 7 Drawing Sheets

HEATING ELEMENT TYPE MASS AIR FLOW SENSOR, AND INTERNAL COMBUSTION ENGINE-CONTROL APPARATUS USING THE SENSOR

BACKGROUND OF THE INVENTION

The present invention relates to a heating element type mass air flow sensor and an internal combustion engine using the sensor, and especially to a heating element type mass air flow sensor suitable for measuring the amount of intake air taken into an internal combustion engine and an internal combustion engine using the sensor.

A heating element type mass air flow sensor has a feature such that it can directly measure a mass air flow-rate, and has been the mainstream sensor for measuring the flow-rate of intake air taken into an internal combustion engine used for a car. Particularly, a heating element type mass air flow sensor using a thin film type detection element fabricated by a semiconductor micro-machining technique has recently attracted due to its low fabrication cost and low power consumption, and an example of such a sensor is disclosed in Japanese Patent Application Laid-Open Hei 10-253414. This document discloses a heating element type mass air flow sensor using a so-called temperature difference method, in which the mass air flow-rate on the sensor is measured from the temperature difference between two thin film-type resistance temperature-sensing elements of the same size, separately located upstream and downstream of a thin film-type heating resistor. This conventional technique is explained below with reference to FIG. 11 and FIG. 12.

Here, FIG. 11 shows a plan view of a sensor element, and FIG. 12 shows a vertical view of the sensor at the x-axis line indicated in FIG. 11. In these figures, reference numbers 2, 3, and 4, indicate a semiconductor substrate, a diaphragm portion, and a heating resistor, respectively. Further, reference numbers 6a and 6c, and 9, indicate resistance temperature-sensing elements, and a cavity portion, respectively. Furthermore, respective reference numbers 12b, 12c, and 12f, and 24, indicate terminal electrodes, and dummy patterned resistors. Meanwhile, the x-axis indicates the air flow direction, and the longitudinal direction of the heating resistor 4 is the y-axis direction.

The cavity portion 9 is shaped on the one side of the semiconductor substrate 2, and the diaphragm portion 3 is formed on the other side of the substrate 2, so as to seal the diaphragm 3. Further, the heating resistor 4 is formed on the diaphragm portion 3, the one element 6a of the paired resistance temperature-sensing elements is formed upstream of the heating resistor 4, and the other one element 6b is formed downstream of the heating resistor 4.

Here, the terminal electrodes 12b, 12c, and 12f, are lead-connection parts of the respective resistor and sensing elements, and the dummy patterned resistors are located so to improve the temperature distribution in the longitudinal direction of the heating resistor 4.

The heating resistor 4 is powered up during the measurement of mass air flow-rate by performing a feed-back control for the turning-on of electricity in the resistor 4, so as to keep the temperature of the resistor 4 higher by a predetermined difference than that of the measured air.

Under these conditions, the mass air flow-rate is measured by comparing the two resistance values of the paired resistance temperature-sensing elements 6a and 6c, located upstream and downstream of the heating resistor 4, respectively, and this measurement manner is the pedigree of the temperature difference method.

Since the resistance values of these resistance temperature-sensing elements 6a and 6c have the temperature dependency, these resistance values are determined by the temperature of the diaphragm 3 on the cavity portion 9. Further, the temperature distribution of the diaphragm 3 depends on the heat generated by the heating resistor 4, and the mass flow-rate flowing on the sensor.

First, when there is no air flow on the sensor, the temperature distribution of the diaphragm 3, caused by the heating resistor 4, is symmetric upstream and downstream of the resistor 4, with respect to the y-axis perpendicular to the air flow direction. Accordingly, there is no difference created between the temperature of the sensing element 6a and that of the sensing element 6c.

On the other hand, when air flows onto the sensor in the x-axis direction, the cooling effect at the sensing element 6a located upstream of the resistor 4, is larger than that at the sensing element 6c, located downstream of the resistor 4. Therefore, a difference, subject to the mass flow-rate of air flowing on the sensor, is created between the temperature of the sensing element 6a, and that of the sensing element 6c.

This temperature difference is detected as a difference between the resistance values of the sensing elements 6a and 6c. Further, when there is no difference between the resistance values of the two sensing elements 6a and 6b, the mass flow-rate of air is set to 0, and is measured by detecting the difference of the resistance values.

However, in the above conventional technique, the temperature distribution, in the direction perpendicular to the measured-air flow direction, of the heating resistor, is not sufficiently taken into account, which in turn causes a problem as per assuring measurement accuracy.

In sensors which use the temperature difference method, although the mass flow-rate of air is measured by detecting the changes in the temperature in the air flow direction, the temperature distribution in the direction perpendicular to the measured air flow direction (the longitudinal direction of the heating resistor) greatly affects on the measuring accuracy.

However, in the conventional technique, the effect of the above temperature distribution in the longitudinal direction of the heating resistor is not sufficiently considered, and the above problem is caused.

Here, although the dummy patterned resister 24 located at one side of each resistance temperature-sensing element contributes the uniform temperature distribution, the shapes of the heating resister 4, and the sensing elements 6a and 6c, themselves, are not specifically taken into account.

The shape of the heating resistor 4 in the conventional technique is symmetric with respect to the y-axis as shown in Figure. However, since the terminal electrodes 12b, 12c, and 12f, of the respective resistors, are located at one side of the respective resistors, the shape patterns of these resistors is asymmetric with respect to the x-axis.

Therefore, when the heating resistor 4 is powered up, heat is generated at the terminal electrode (the lead-connection part) 12c, which in turn shifts the peak in the temperature distribution of the heating resistor 4 toward the lead-connection part 12c in the y-axis direction, as shown by the solid line 25 in FIG. 13.

As explained above, since a shift (ΔL) of the peak in the temperature distribution with respect to the central point in the length (L1) of the heating resistor 4 is caused, a distortion of the temperature distribution in the range of the length (L2) of the resistance temperature-sensing elements 6a and 6c occurs, and this causes an error in measuring the mass air flow-rate (in measuring the temperature difference between the elements 6a and 6c).

If the x-axis direction is inclined to the air flow direction by the variation in the attachment position of the mass air flow sensor, this error in measuring the mass air flow-rate becomes remarkable, and the shift (ΔL) of the peak in the temperature distribution also becomes large, which in turn may shift the peak out of the effective regions of the respective sensing elements 6a and 6c.

Moreover, in the conventional technique, since the lead-connection parts 12b and 12f of the sensing elements 6a and 6c are made of the same material (with the same resistance values) as that (those values) of the sensing elements 6a and 6c, the resistance values of these lead-connection parts 12b and 12f have a temperature dependency. To top it all off, since these lead-connection parts 12b and 12f are located on one side of these sensing elements 6a and 6c, the temperature distribution in each of these sensing elements 6a and 6c, as well as the heating resistor 4, becomes asymmetric with respect to the x-axis, and these sensing element 6a and 6c also increase the error in measuring the mass air flow-rate.

SUMMARY OF THE INVENTION

An objective of the present invention is to provide a heating element type mass air flow sensor in which the measurement accuracy is sufficiently improved by properly adjusting the temperature distribution in the mass air flow sensor.

To achieve the above objective, the present invention provide a heating element type mass air flow sensor for measuring air flow-rate by using at least a heating resistor, situated on one side surface of an electrical insulation layer formed on a semiconductor substrate, covering a cavity portion shaped in the semiconductor substrate, wherein the heating resistor is, substantially in a straight line, located in the direction substantially perpendicular to the direction of an air flow to be measured; slits are shaped in the heating resistor; and current is passed through the heating resistor so as to heat the heating resistor.

Further, in the above heating element type mass air flow sensor, the heating resistor has a structure such as that the density of current flowing in the respective areas, in which the slits are shaped, is higher than the density of current flowing other areas of the heating resistor.

Furthermore, the present invention provides a heating element type mass air flow sensor for measuring air flow-rate by using at least a heating resistor, situated on one side surface of an electrical insulation layer formed on a semiconductor substrate, covering a cavity portion shaped in the semiconductor substrate, wherein a region in the electrical insulation thin-layer, the region just covering the cavity portion in the semiconductor substrate, is substantially a rectangle with the size w in the direction of the air flow, and the size D in the direction perpendicular to the air flow; and those sizes should satisfy the inequality: D>4W.

Also, the present invention provides a heating element type mass air flow sensor for measuring air flow-rate by using; at least a heating resistor, situated on one side surface of an electrical insulation layer formed on a semiconductor substrate, covering a cavity portion shaped in the semiconductor substrate; and at least one pair of resistance temperature-sensing elements separately arranged upstream and downstream of the heating resistor, respectively, on the electrical insulation thin-layer; wherein a region of the electrical insulation thin-layer, the region just covering the cavity portion in the semiconductor substrate, is substantially a rectangle with the size w in the direction of the air flow, and the size D in the direction perpendicular to the air flow, and those sizes should satisfy the inequality: D>4W; the heating resistor has the length L1, and the length L1 and the size D should satisfy the inequality: D>1.1×L1; and each resistance temperature-sensing element has the length L2, and the length L2 and the length L1 should satisfy the inequality: L1>1.05×L2.

DETAILED DESCRIPTION OF THE EMBODIMENTS

Hereafter, the embodiments of a heating element type mass air flow sensor according to the present invention will be explained in detail with reference to the drawings.

Figure 1:
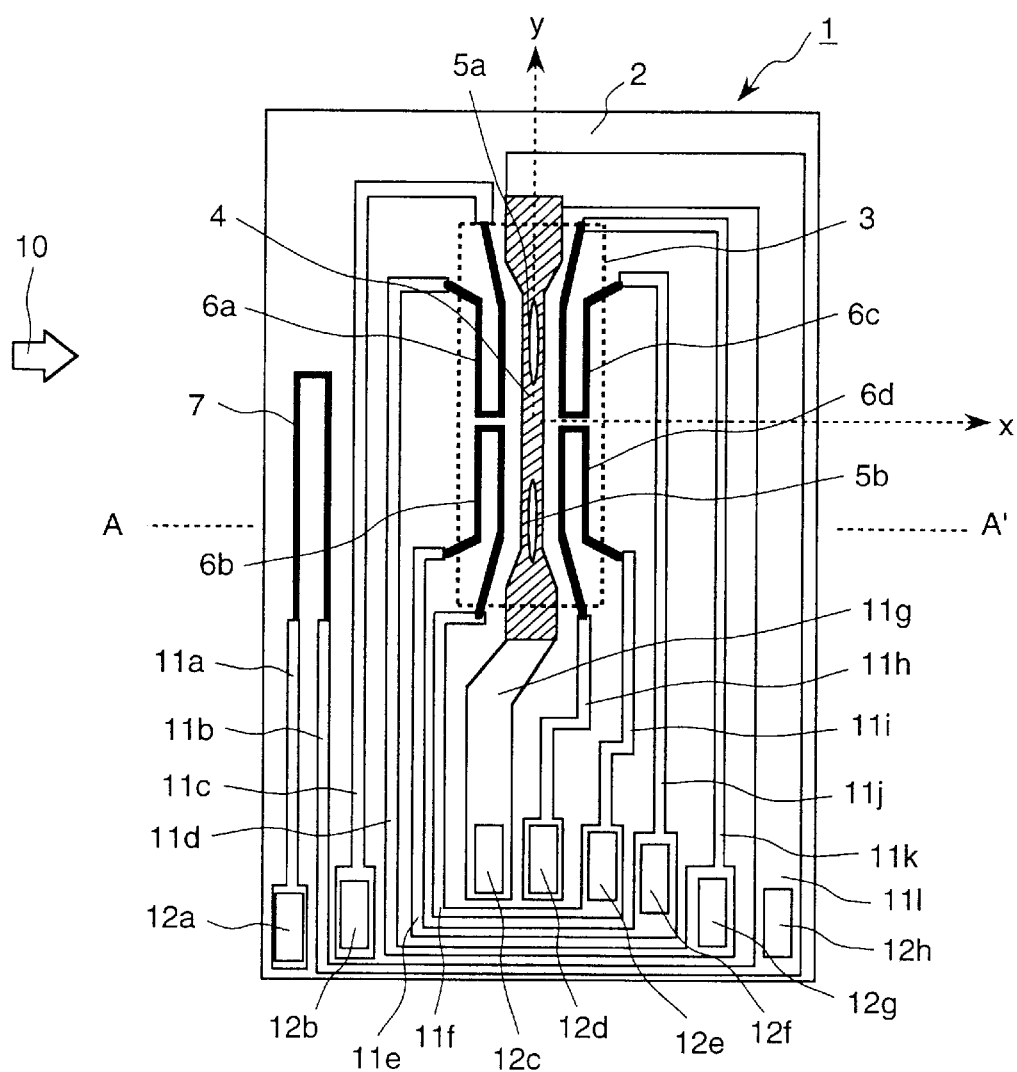
FIG. 1 is a plan view of a sensor element of a heating element type mass air flow sensor of an embodiment according to the present invention.
Figure 2:
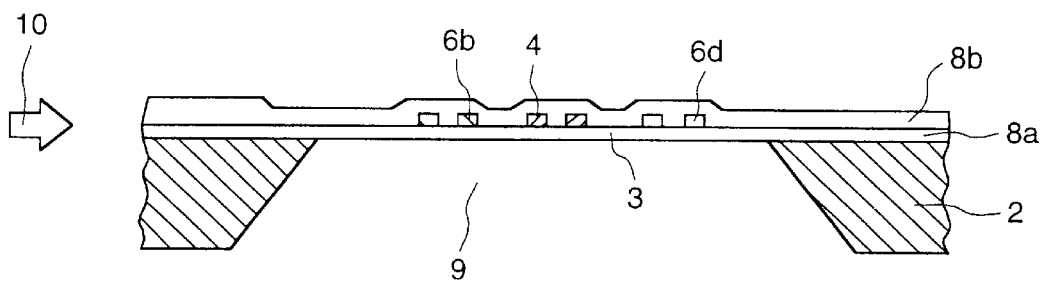
FIG. 2 is a vertical cross section of the sensor element shown in FIG. 1.
Figure 3:
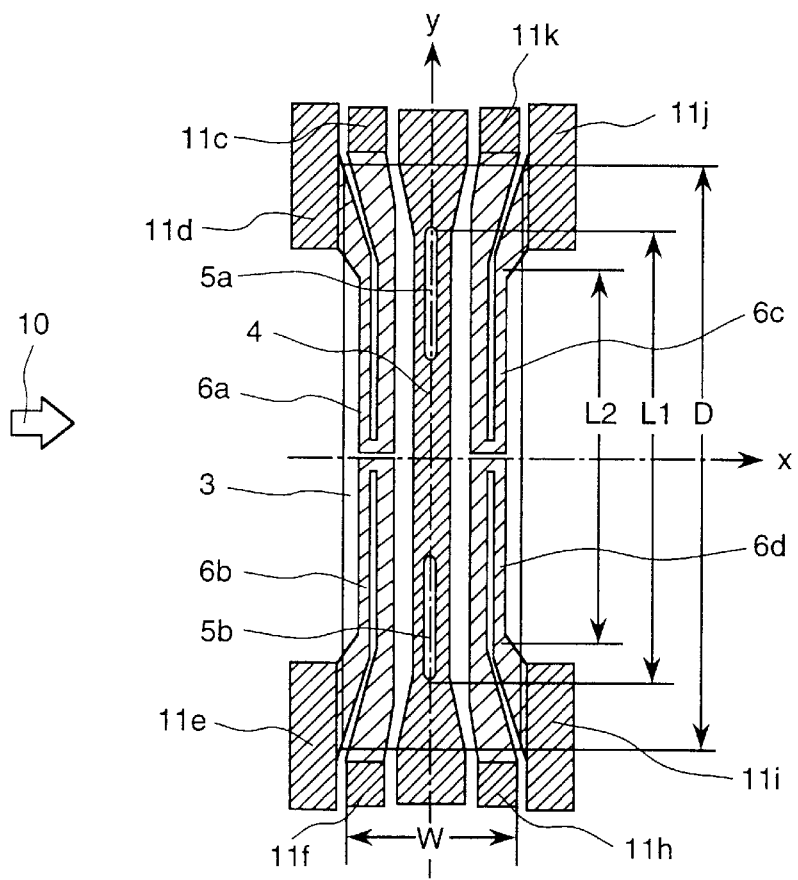
FIG. 3 is an expanded view of a main portion of the sensor element shown in FIG. 1.

FIG. 1 shows a plan view of a sensor element of a heating element type mass air flow sensor of an embodiment according to the present invention, and FIG. 2 shows a vertical cross section of the sensor element shown in FIG. 1. Further, FIG. 3 shows an expanded view of a main portion of the above sensor element. Reference number 1 indicates the sensor element 1, formed on a semiconductor substrate 2.

The semiconductor substrate 2 is a plate made of monocrystal silicon (Si), on one side of which a cavity portion 9 is shaped, and on the other side (an upper surface shown in FIG. 2) of which a diaphragm portion 3 is formed. Here, the plan-view shape of the cavity portion 9 is substantially a rectangle.

The diaphragm portion 3 corresponds to an area covering the cavity portion 9, in an electrical insulation layer 8a formed on one surface of the semiconductor substrate 2. Further, a heating resistor 4, a pair of resistance temperature-sensing elements 6a and 6b located upstream of the resistor 4, and another pair of resistance temperature-sensing elements 6c and 6d located downstream of the resistor 4, are formed on the surface of the electrical insulation layer 8a. Here, the surface of the electrical insulation layer 8a is made of silicon dioxide ($SiO_2$) thin film.

The heating resistor 4 is made of polycrystal or monocrystal silicon thin film into which impurity is doped so that the film has a predetermined electrical conductivity (resistance). Also, its shape is a thin ribbon in which slits 5a and 5b are shaped, and the heating resister 4 is divided in the lateral direction at the part near each end side of the resistor 4. Thus, a heating current flows in the heating resistor 4 in the y-axis direction, while being divided at each of the slits 5a and 5b.

Further, the resistance temperature-sensing elements 6a–6d are also made of polycrystal or monocrystal silicon thin film into which impurity is doped so that the film has a predetermined electrical conductivity (resistance), and they are shaped as a thin ribbon.

Furthermore, an air temperature-sensing resistor 7, lead-connection stripes 11 (11a, 11b, 11c, 11d, 11e, 11f, 11g, 11h, 11i, 11j, 11k, and 11l) for the respective resistors, and terminal electrodes 12 (12a, 12b, 12c, 12d, 12e, 12f, 12g, and 12h), are composed on a region outside the diaphragm portion 3, of the electrical insulation layer 8a.

The air temperature-sensing resistor 7 is also made of polycrystal or monocrystal silicon thin film into which impurity is doped so that the film has a predetermined electrical conductivity.

On the other hand, although the lead-connection stripes 11 are also made of polycrystal or monocrystal silicon thin film into which impurity is doped, the concentration of the impurity in the stripes 11 is increased so that the conductivity becomes much higher.

The terminal electrodes 12 are thin film pads made of aluminum (Al), gold (Au), etc.

Moreover, the surface of the electrical insulation layer 8a is covered with an electrical insulation layer 8b so that the resistors and so on are protected, as shown in FIG. 2.

Here, the heating resistor 4 is located on a line along the direction (the y-axis direction) perpendicular to the air flow direction shown by the arrow 10, (the x-axis direction). Further, as described above, the slits 5a and 5b are shaped in the heating resistor 4, and this resistor is divided in the lateral direction at an area near each end side portion of the resistor 4. Furthermore, the pairs of resistance temperature-sensing elements (6a and 6b) and (6c and 6d) are separately and symmetrically arranged upstream and downstream of the heating resistor 4 in the air flow direction, respectively.

Therefore, the heating resistor 4, and the resistance temperature-sensing elements 6a, 6b, 6c, and 6d, are symmetrically formed with respect to both the air flow direction (the x-axis direction) and the direction perpendicular to the air flow direction, (the y-axis direction), that is, they are formed in the two-rotation symmetry manner.

In the following, the measurement operation of the heating element type mass air flow sensor of this embodiment will be explained.

First, current is fed to the heating resistor 4, thermally insulated by the electrical insulation layer 8a and the cavity portion 9, and the fed current is controlled so that the temperature of the resistor 4 is kept higher by a predetermined amount than that of the air flow 10.

Here, the temperature of the air flow 10 is detected by measuring the resistance value of the air temperature-sensing resistor 7, as explained later.

Thus, the mass flow-rate of air, and the air flow direction, are measured by comparing the temperature (the resistance) of the upstream resistance temperature-sensing elements 6a and 6b with that of the downstream resistance temperature-sensing elements 6c and 6d.

When the mass flow-rate of air is 0, since the heating conditions for the pair of the upstream resistance temperature-sensing elements 6a and 6b are equal to those for the pair of the downstream resistance temperature-sensing elements 6c and 6d, both the temperature values of the two pairs, due to the heat generated by the heating resistor 4, indicate the same value, that is, no temperature difference appears between the two pairs.

On the other hand, when air flows in the direction indicated by the arrow 10, (called the forward flow); since the cooling effect of the air flow 10, on the pair of the upstream resistance temperature-sensing elements 6a and 6b, is stronger than that on the pair of the downstream resistance temperature-sensing elements 6c and 6d, a temperature difference is generated between the two pairs, and the mass flow-rate of the air flow 10 is measured, based on the detected temperature difference.

Conversely, when air flows in the direction reverse to that of the arrow 10, (called the reverse flow); since the temperature of the air flow 10, of the pair of the upstream resistance temperature-sensing elements 6a and 6b, is lower than that of the pair of the downstream resistance temperature-sensing elements 6c and 6d, the sign of the temperature difference between the two is reversed.

Therefore, the mass flow-rate of the air flow 10 is measured from the quantity of the temperature difference, and the direction of the air flow 10 is determined from the sign of the temperature difference.

Figure 4:
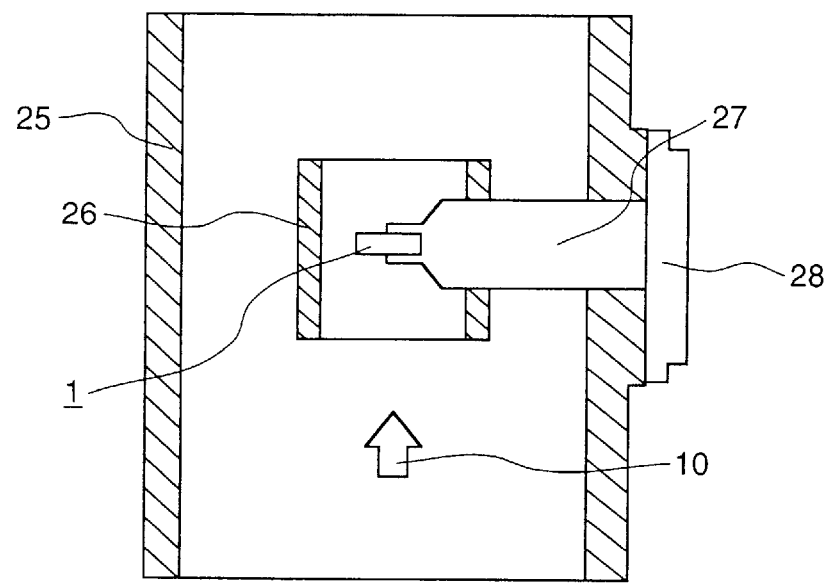
FIG. 4 is a diagram showing an example of a mounting arrangement of the heating element type mass air flow sensor according to the present invention.

FIG. 4 shows an example of a mounting arrangement of the heating element type mass air flow sensor according to the present invention, and in this example, the heating element type mass air flow sensor of this embodiment is located in an air intake path 25 in an internal combustion engine of a car, whose cross section is shown in FIG. 4. In this figure, the sensor element 1 supported by a support member 27 connected to an external circuit 28 is located in a secondary air intake path 26 situated in the air intake path 25. Accordingly, the terminal electrodes 12 shown in FIG. 1 are connected to the external circuit 28 via the support member 28.

Here, the intake air taken into the internal combustion engine usually flows in the direction indicated by the arrow 10 (the forward flow). However, the intake air sometimes flows in the direction reverse to that of the arrow 10 (the reverse flow). In accordance with the mass air flow sensor of this embodiment, both the forward and reverse flow can be correctly measured, and the flow direction of the intake can also be determined.

Figure 5:
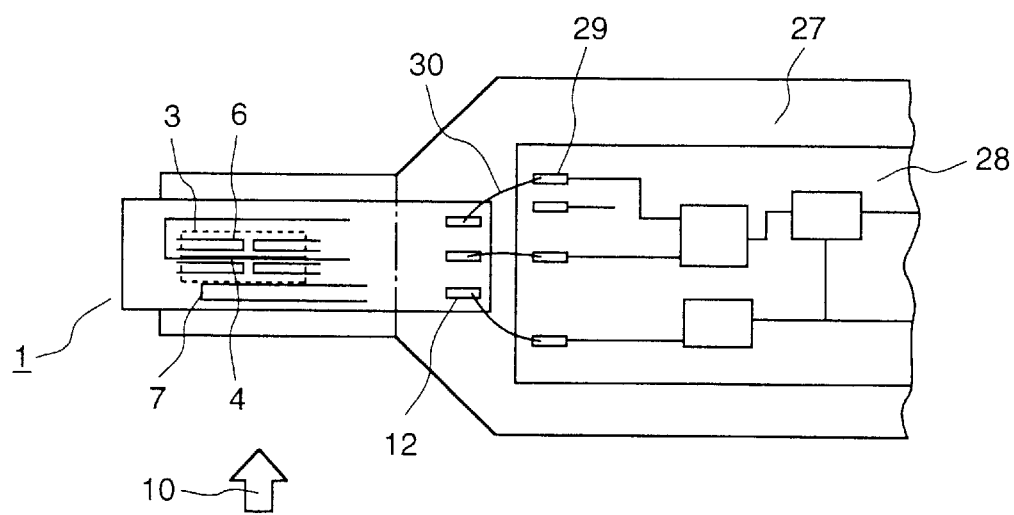
FIG. 5 is an illustration showing a mounting arrangement of the sensor element and its measurement circuit of the heating element type mass air flow sensor according to the present invention.

Next, FIG. 5 shows an expanded diagram of a main area of the mass air flow sensor, in which the support member 27 exists along with the sensor element 1. As shown in this figure, the sensor element 1 is attached to the support member 27 made of insulating material, and the external circuit, on which a signal-processing circuit and terminal electrodes 29 are formed on an electrical insulation substrate, is also attached to the support member 27.

The sensor element 1 is electrically connected to the external circuit 28 by performing the wire-bonding of the terminal electrodes 12 and the terminal electrodes 20 with gold wires. Moreover, the sensor element 1, the external circuit 28, the terminal electrodes 12, the terminal electrodes 20, and the gold wires, are covered with another support member, not shown in this figure, so as to protect these components.

In the following, the circuit composition of the heating element type mass air flow sensor of this embodiment will be explained with reference to FIG. 6.

Figure 6:
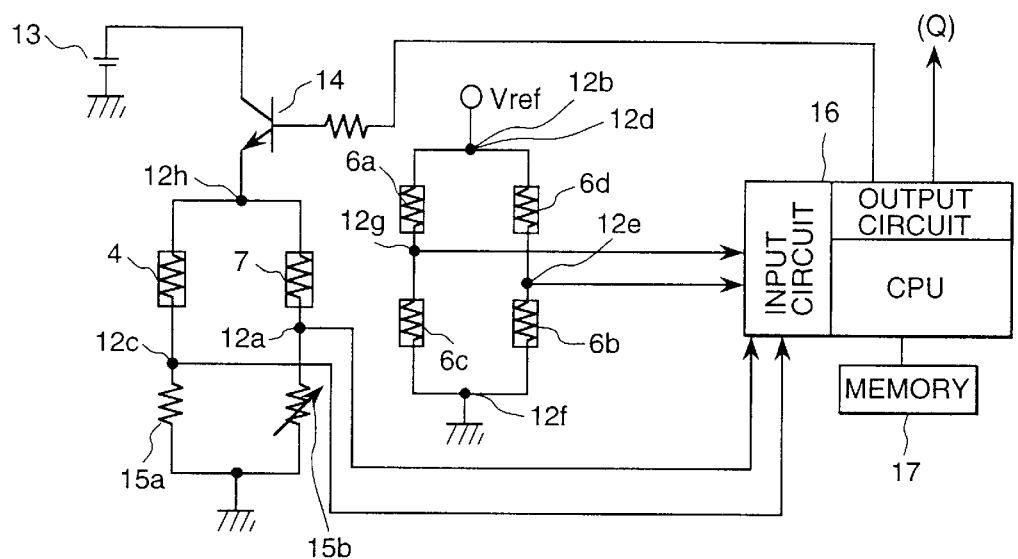
FIG. 6 is a diagram showing the more detailed measurement circuit of the heating element type mass air flow sensor according to the present invention.

The circuit shown in FIG. 6 includes the respective resistors 4, 6a, 6b, 6c, 6d, and 7, and a circuit for driving and controlling these resistors. Further, in this figure, reference numbers 13, 14, 15a and 15b, 16, and 17, indicate a power source, a transistor, resistors, a control unit, and a memory, respectively. Furthermore, the control unit 16 is composed of an input circuit including an A/D converter, an output circuit including a D/A converter, a CPU for executing calculational-processes, etc.

First, the heating resistor 4 and the air temperature-sensing resistor 7 compose a bridge circuit along with the resistors 15a and 15b, and the voltage at the terminals 12a and 12c of these resistors is input to the control circuit 16. Further, the resistance values of the respective resistors 15a and 15b are set to values such that the temperature (Th) of the heating resistor 4 is kept higher by a predetermined value ($\Delta Th = Th - Ta = 150°$ C.) than that of the air temperature-sensing resistor 7, and this bridge circuit is controlled by the control circuit 16.

That is, the control circuit 16 controls the temperature difference $\Delta Th$ so as to keep the predetermined value by sending a control signal to turn on the transistor 14 if the temperature difference $\Delta Th$ is smaller than a predetermined temperature, and otherwise, sending a control signal to turn off the transistor 14 so that the heating current in the heating resistor 4 is 0.

The temperature difference between the upstream pair of resistance temperature-sensing elements 6a and 6b and the downstream pair of resistance temperature-sensing elements 6c and 6d is detected, based on the voltage difference between the terminals 12g and 12e of the bridge circuit composed of the upstream resistance temperature-sensing elements 6a and 6b and the downstream resistance temperature-sensing elements 6c and 6d.

First, when the mass air flow-rate is 0, the resistance value of an adjustment resistor (not shown in this figure) is adjusted so as to make the voltage of the terminal 12g agree with that of the terminal 12e, in the bridge circuit; or the voltage difference between the terminals 12g and 12e at the zero mass air flow-rate, is memorized in the memory 17.

The relationship between the flow-rate (Q) and the voltage difference between the terminals 12g and 12e is stored as a map in the memory 17 in advance. The value (Q) of the measured mass air flow-rate is obtained by searching the stored map with respect to the detected voltage difference between the terminals 12g and 12e, and the direction of the air flow is determined by comparing the voltage values of the two terminals 12g and 12e.

Here, in this embodiment, since the heating resistor 4 and the air temperature-sensing resistor 7 is formed of thin-film monocrystal or polycrystal silicon semiconductor, with the same impurity concentration so as to have the same temperature coefficient ($\alpha$) of resistance, the ratio of the resistance value of the resistor 15a to that of the resistor 15b is simply proportional to the ratio of the temperature (resistance) value of the heating resistor 4 and that of the air temperature-sensing resistor 7, such that the latter ratio realizes the predetermined temperature difference $\alpha$ Th (for example, 150° C.), which in turn makes it easy to set the resistance values of the resistors 15a and 15b.

Further, in the bridge circuit composed of the resistance temperature-sensing elements 6a, 6b, 6c, and 6d, the upstream pair of elements 6a and 6b, and the downstream pair of elements 6c and 6d, are arranged, crossing each other, as shown in FIG. 6. Accordingly, the voltage difference between the terminals 12g and 12e in the above bride-circuit composition is larger by about two times of that in a bridge circuit composed of only one pair of resistance temperature-sensing elements, and this improves the sensitivity and accuracy of the measurement of mass air flow-rate.

Next, the temperature distribution in the diaphragm portion 3 in the sensor element 1 of the heating element type mass air flow sensor of this embodiment, is explained below with reference to FIG. 7, FIG. 8, and FIG. 9.

Figure 7:
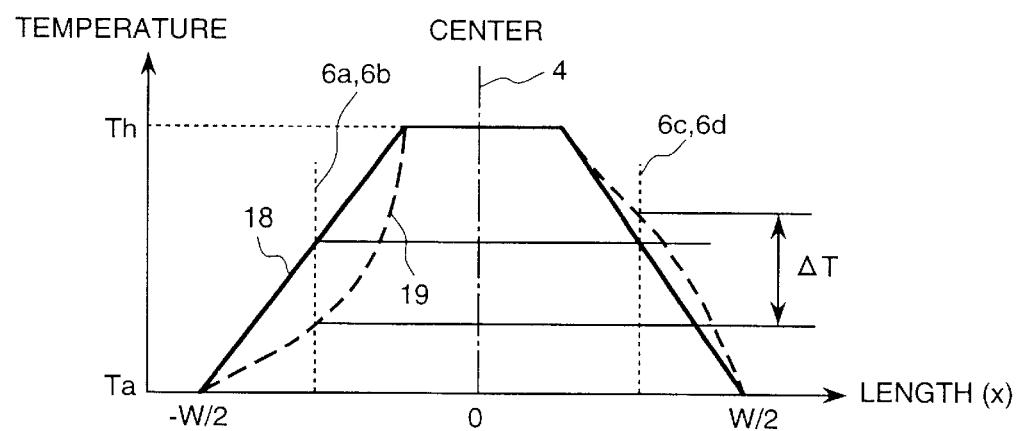
FIG. 7 is a graph showing the change in the temperature distribution in a diaphragm portion of a conventional mass air flow sensor.

FIG. 7 shows the temperature distribution in the x-axis direction, in the diaphragm portion 3 shown in FIG. 3. In this figure, $x=0$ indicates the position of the heating resistor 4, and the symbol W indicates the width of the diaphragm portion 3, as shown in FIG. 3. Accordingly, $x=\pm W/2$ indicates both the end side positions of the diaphragm portions 3. Thus, the pair of resistance temperature-sensing elements 6c and 6d, and the pair of resistance temperature-sensing elements 6a and 6b, are arranged in intervals between the position ($x=0$) and the respective positions ($x=\pm W/2$), respectively.

As explained above, the temperature (Th) of the heating resistor 4 is controlled to be higher by a predetermined value than that (Ta) of the air temperature-sensing resistor 7, that is, the temperature of the air flow.

Further, the heat generated by the heating resistor 4 located at the position ($x=0$) is transferred, via the diaphragm portion 3 in the electrical insulation layer 8a, to the semiconductor substrate 2 at the respective positions ($x=\pm W/2$), at which the temperature is the air temperature (Ta).

Consequently, in the temperature distribution in the diaphragm portion 3, as shown by the solid line 18 in FIG. 7, the temperature continuously decreases from the value (Th) at the position ($x=0$) to the value (Ta) at the end side positions ($x=\pm W/2$).

Here, when the mass air flow-rate is 0, since the temperature distribution is such as that shown by the solid line 18, the upstream pair of resistance temperature-sensing elements 6a and 6b, and the downstream pair of resistance temperature-sensing elements 6c and 6d, indicate the same temperature. Thus, there is no temperature difference between the pairs.

On the other hand, when the air flows in the x-axis direction, since the cooling effect of the air flow on the upstream pair of resistance temperature-sensing elements 6a and 6b is stronger than that on the downstream pair of resistance temperature-sensing elements 6c and 6d, the temperature distribution changes to one such as that shown by the dotted line 19, and the temperature difference between the pairs is created. Thus, the mass air flow-rate (Q) is measured, based on the temperature difference ( ), and the direction of the air flow is determined according to the sign of the difference.

Figure 8:
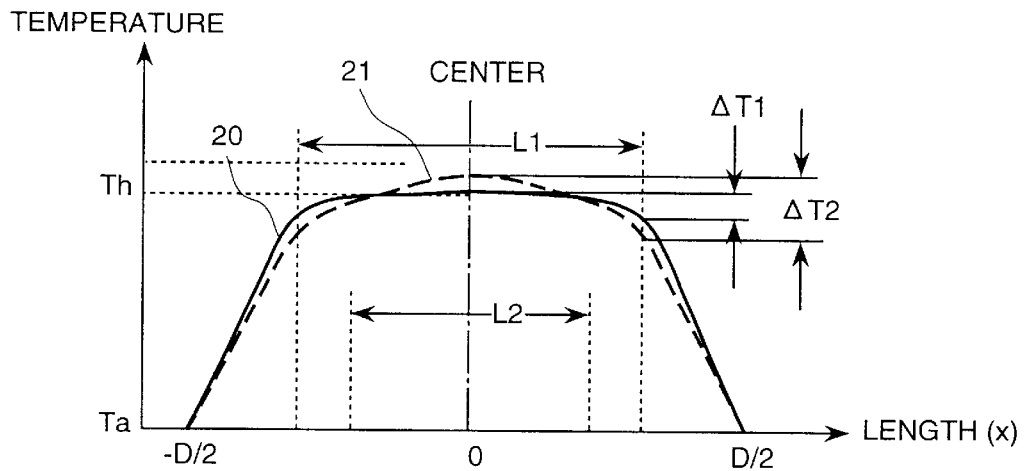
FIG. 8 is a graph showing the comparison of the temperature distribution in a diaphragm portion of a mass air flow sensor with slits in a heating resistor, of an embodiment according to the present invention, and that of a mass air flow sensor without slits in a heating resistor.

Next, FIG. 8 shows the temperature distribution in the y-axis direction, in the diaphragm portion 3 shown in FIG. 3. In this figure, y=0 indicates the center position of the heating resistor 4 and the diaphragm portion 3, and y=±D/2 indicates both the end side positions of the diaphragm portions 3 in the y-axis direction. Further, the symbol L2 indicates the length in the y-axis direction, of the upstream pair of resistance temperature-sensing elements 6a and 6b, and the downstream pair of resistance temperature-sensing elements 6c and 6d.

Further, in FIG. 8, the solid line 20 shows the temperature distribution in the case where the slits 5a and 5b are shaped in the heating resistor 4 as shown in FIG. 3, that is, the temperature distribution in the y-axis direction, in the diaphragm portion 3 in the mass air flow sensor of this embodiment. On the other hand, for a comparison with the above case, the dotted line 21 shows the temperature distribution in the y-axis direction, in the diaphragm portion 3, in the case where the slits 5a and 5b are not shaped in the heating resistor 4.

As seen in FIG. 8, both the temperature distributions in the diaphragm portion 3, indicated by the solid line 20 and the dotted line 21, are symmetric with respect to the center position (x=0). Therefore, it is proved that the problem of the asymmetric temperature distribution in the y-axis distribution, discussed in the conventional technique with reference to FIG. 3, is resolved by the mass air flow sensor of this embodiment.

This is because the heating resistor 4, and the resistance temperature-sensing elements 6a, 6b, 6c, and 6d, are symmetrically arranged with respect to the air flow direction (the x-axis direction) and the direction (the y-axis direction) perpendicular to the former direction, that is, in a two-revolution symmetric manner), in the region of the diaphragm portion 3.

Next, when the solid line 20 is compared with the dotted line 21, the maximum temperature difference in the range of the length L1 of the heating resistor 4 is $\Delta T1$ in the solid line 20, and is $\Delta A2$ in the dotted line 21. Thus, it is seen that since $\Delta T1<\Delta T2$, the temperature distribution indicated by the solid line 20 is flatter than that indicated by the dotted line 21.

This is because the cross-sectional area of each region near each end portion of the heating resistor 4, in which one of the slits 5a and 5b is shaped, is reduced, and the current density of the current flowing, that is, the heat-generation-density, in this area, is increased. Thus, it is not particularly necessary to make the width of these areas of the heating resistor 4 wider in order to realize a flat temperature distribution, which in turn is effective for downsizing the heating resistor 4.

Further, by setting the length L1 of the heating resistor 4 and the length L2 of the pairs of resistance temperature-sensing elements (6a and 6b) and (6c and 6d) so as to satisfy the inequality L1>(1.05×L2), the pairs of resistance temperature-sensing elements (6a and 6b) and (6c and 6d) can be located in the region where the temperature distribution is flat, and this makes the measured temperature values more stable, which in turn can improve the measurement accuracy.

Figure 9:
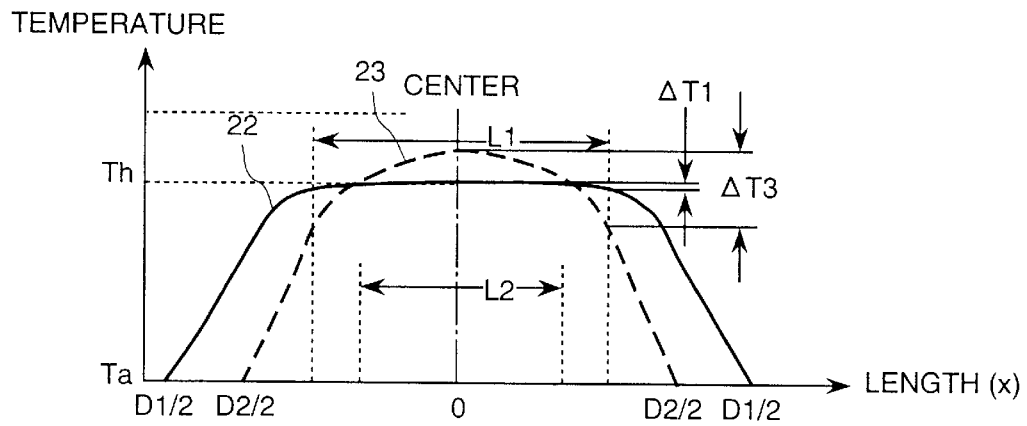
FIG. 9 is a graph showing the change in the temperature distribution in a diaphragm portion, corresponding to the change in the length of the diaphragm portion, of a mass air flow sensor of an embodiment according to the present invention.

Next, FIG. 9 shows the change in the temperature distribution in the y-axis direction, of the diaphragm portion 3, when changing the length D in the y-axis direction, of the diaphragm portion 3, from D1 to D2 (D1>D2). Here, the solid line 22 indicates the temperature distribution in the case where the length D in the y-axis direction, of the diaphragm portion 3, is D1 (a long length), and the dotted line 23 indicates the distribution in the case where the length D in the y-axis direction, of the diaphragm portion 3, is D1 (a short length).

As seen in FIG. 9, the maximum temperature-difference $\Delta\Delta T1$ in the range of the long length D (D1) of the diaphragm portion 3 is smaller than that $\Delta A2$ in the range of the long length 3 (D2). Thus, it is proved that the temperature distribution in the diaphragm portion 3 with a longer length is more flattened.

This is because when the length D in the y-axis direction, of the diaphragm portion 3, becomes shorter, since the distance between the respective ends of the heating resistor 4 and the respective ends of the diaphragm portion 3 is shortened, the thermal resistance between the heating resistor 4 and the semiconductor substrate 2 is decreased. Accordingly, the heat generated by the heating resistor 4 is easily conducted to the semiconductor substrate 2, and this makes the temperature distribution in the diaphragm portion 3 steeper, and causes the temperature distribution shift from the flat one to be realized.

Here, it is more favorable that the composition of the mass air flow sensor satisfies the inequality: D>4W, with respect to the length D in the y-axis direction and the width W in the x-axis direction, of the diaphragm portion 3; and further the inequality: D>(1.1 L1), with respect to the length D in the y-axis direction, of the diaphragm portion 3, and the length L1 of the heating resistor 4.

If $D\leq 4W$, since the width W in the x-axis direction, of the diaphragm portion 3 is larger than the length D in the y-axis direction, of the diaphragm portion 3, the stress on the diaphragm portion 3 greatly increases, and the mechanical strength remarkably decreases.

Further, if $D\leq 4W$, since the volume in the air flow direction (the x-axis direction), of the diaphragm portion 3, is increased, the required heating time of the heating resistor 4 increases, which in turn degrades the time response of the sensor element 1.

Furthermore, since the increase of the width of the diaphragm portion 3 equivalently causes the increase of the distance between the heating resistor 4 and the respective pairs of resistance temperature-sensing elements (6a and 6b) and (6c and 6d), the time of thermal conduction from the heating resistor 4 and the respective pairs of resistance temperature-sensing elements (6a and 6b) and (6c and 6d), is also increased, which in turns degrades the time response of the sensor element 1.

Thus, by composing the sensor element 1 so as to satisfy the inequality: D>4W, with respect to the length D in the y-axis direction and the width W in the x-axis direction, of the diaphragm portion 3, since the length D in the y-axis direction, of the diaphragm portion 3, can sufficiently be ensured without degrading the mechanical strength, and with assuring the time response, of the sensor element 1, it has become possible that the ensuring of the mechanical strength, and the assuring of the flat and stable temperature distribution, are compatible with each other.

Figure 10:
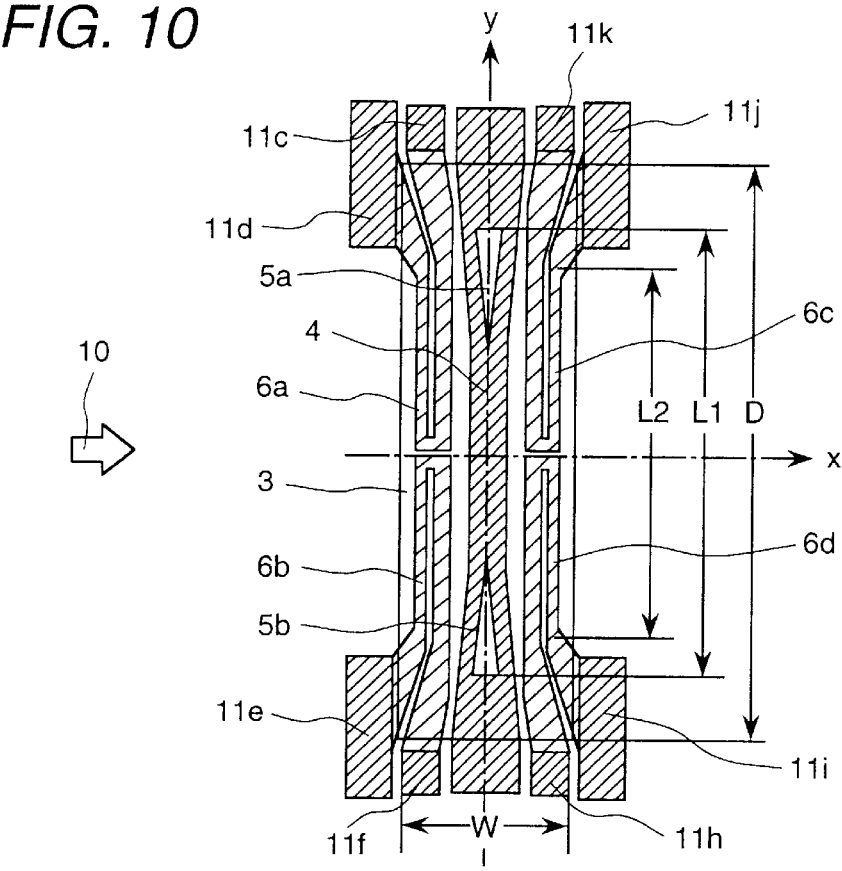
FIG. 10 is an expanded view of a main portion of a sensor element of a mass air flow sensor of another embodiment according to the present invention.
Figure 11:
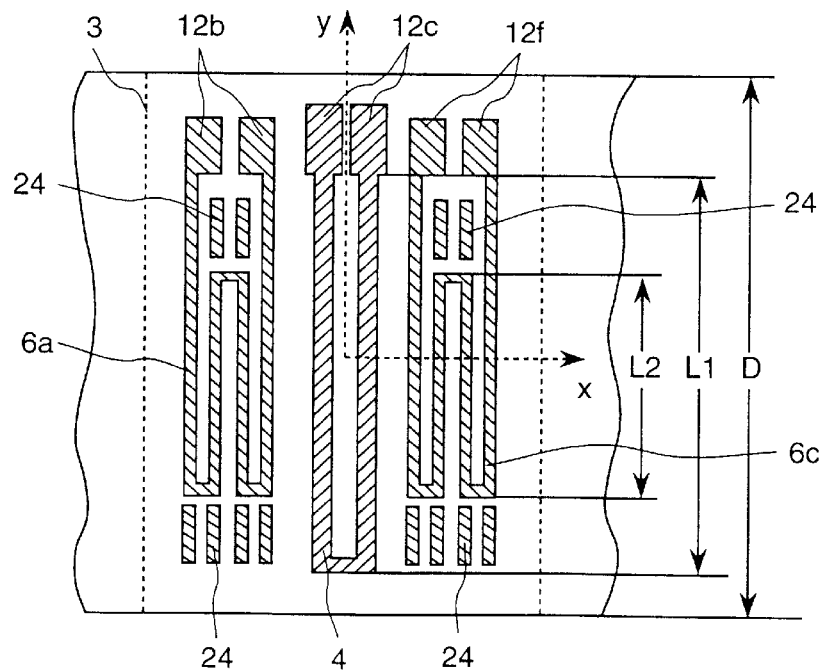
FIG. 11 is a plan view of a sensor element of a conventional mass air flow sensor.
Figure 12:
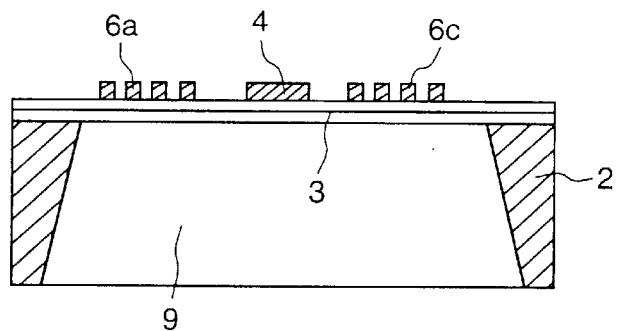
FIG. 12 is a vertical cross section of the sensor element shown in FIG. 11.
Figure 13:
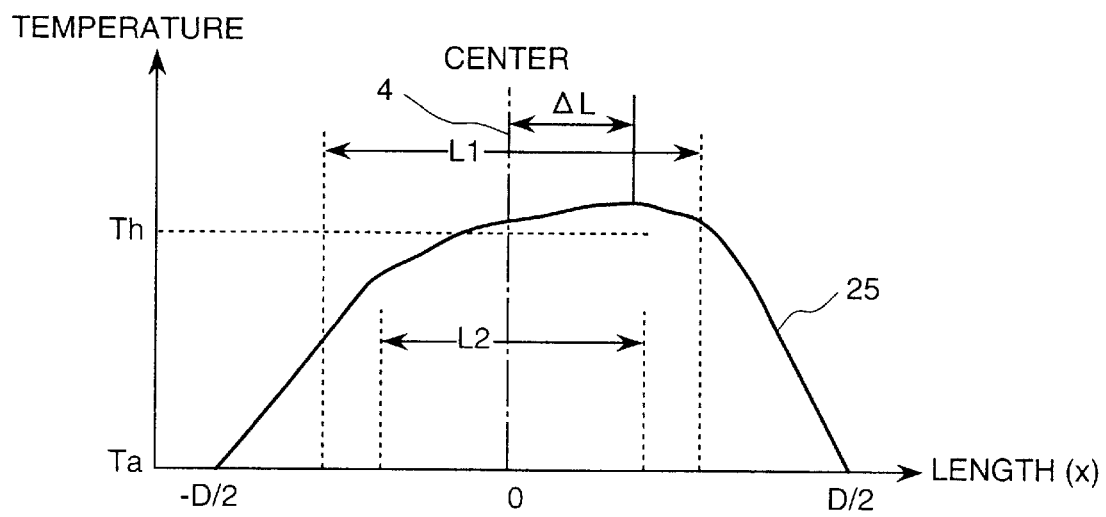
FIG. 13 is a graph showing the temperature distribution in a diaphragm portion of a conventional mass air flow sensor.

FIG. 10 shows an expanded view of a main portion of the sensor element 1 in the mass air flow sensor of another embodiment according to the present invention, and the points different from the sensor element 1 of the embodiment shown in FIG. 3 are in the plan-view shapes of the heating resistor 4 and the slits 5a and 5b shaped in the respective areas near the end portions of the heating resistor 4.

As shown in FIG. 10, in this embodiment, the shape of the slits 5a and 5b is cuneal, and the width of the heating resistor 4 increases in proportion as the position of the heating resistor 4 approaches towards the respective end sides of the resistor 4.

Although the resistance values in the heating resistor 4 increase near the slits 5a and 5b, and the amount of heat generation accordingly increases there, in the embodiment shown in FIG. 3, the resistance values (the amount of heat generation) are not changed, the distance between the heat generation position of the resistor 4 and the respective resistance temperature-sensing elements 6a, 6b, 6c, and 6d is continuously reduced towards the respective end sides of the resistor 4.

Thus, according to this embodiment also, since the temperature distribution in the diaphragm portion 3, especially in the region where the resistance temperature-sensing elements 6a, 6b, 6c, and 6d are arranged, becomes uniform, the measurement accuracy can be improved.

Moreover, in the above embodiments, since the heating resistor 4, the respective resistance temperature-sensing elements 6a, 6b, 6c, and 6d, and the air temperature-sensing resistor 7, is made of the monocrystal or polycrystal silicon semiconductor thin-film 2, in which impurities are doped, the material cost of the above elements can be reduced in comparison with the case where noble metal such as platinum is used for those elements.

Here, it is possible to select the resistance values of those elements arbitrarily based on the relationship between the voltage of a power source and the amount of heat generation.

For example, it is possible to set the resistance value of the heating resistor 4 to a value in the range of 50–1000 Ω, and the resistance values of the respective resistance temperature-sensing elements 6a, 6b, 6c, and 6d, and the air temperature-sensing resistor 7 to values in the range of 1–30 kΩ.

In the following, the fabrication processes of the sensor element 1 in the heating element type mass air flow sensor of the above described embodiments will be explained.

Meanwhile, although an SOI (Silicon on Insulator) substrate is used in the following example, the semiconductor substrate used in the embodiments according to the present invention-is not restricted to an SOI substrate.

The SOI substrate is obtained by forming a silicon dioxide layer with a 0.4 μm thickness the surface of a monocrystal silicon substrate, using a thermal oxidization method. This silicon dioxide layer corresponds to the electrical insulation layer 8a.

Next, another monocrystal silicon substrate is stuck on the surface of the silicon oxide layer of the above monocrystal silicon substrate, and the processing of anneal for bonding is performed on the above substrates at 1100° in an oxidizing atmosphere in order to ensure the bonding of the-two substrates.

Further, the SOI substrate, which includes a semiconductor substrate made of monocrystal silicon, a silicon-oxide electrical insulation layer with about 0.4 μm thickness, and a monocrystal silicon layer with about 1 μm thickness, used for forming resistors, is obtained by performing a thin-wall processing using grinding and polishing processes, on the surface of the monocrystal silicon plate.

Furthermore, the impurity-doping process is implemented for the monocrystal silicon layer used to form resistors, on the SOI substrate as follows.

First, a low-concentration impurity diffusion process is implemented onto the whole surface of the monocrystal silicon layer by using a thermal diffusion method or an ion-implantation method, and a low-concentration impurity diffusion is implemented onto the region of the monocrystal silicon layer in the diaphragm portion 3, other than the regions for the resistance temperature-sensing elements 6a, 6b, 6c, and 6d, with a masking film made of silicon oxide, by using the thermal diffusion method or the ion-implantation method.

Next, after removing the masking film, and further forming a resist pattern of a predetermined shape by using the well-known lithography technique, the respective resistors 4, 6a, 6b, 6c, 6d, and 7, and the lead-connection stripes 11 (11a, 11b, 11c, 11d, 11e, 11f, 11g, 11h, 11i, 11j, 11k, 11l) are formed by implementing a patterning process on the semiconductor layer, using a reactive ion-etching method and so on.

Consequently, since the impurity concentration of the resistance temperature-sensing elements 6a, 6b, 6c, and 6d is set to a lower concentration value than that of the heating resistor 4 and the air temperature-sensing resistor 7, the thermal resistance coefficient of the monocrystal silicon layer which forms the resistance temperature-sensing elements 6a, 6b, 6c, and 6d is increased, and this contributes to the improvement of the measurement sensitivity.

Similarly, since the impurity concentration of the lead-connection stripes 11 (11a, 11b, 11c, 11d, 11e, 11f, 11g, 11h, 11i, 11j, 11k, 11l) is higher than the impurity concentration of the resistance temperature-sensing elements 6a, 6b, 6c, and 6d, the lead-connection stripes 11 have the higher electric-conductivity and the lower resistance, unnecessary heat-generation and resistance increase can be suppressed, which in turn contributes to the improvement of the measurement accuracy.

As a post-process, a silicon dioxide layer with 0.5 μm thickness is formed by using a CVD method, etc., which is to be used for the protection layer.

Here, as per the material used for the protection layer 8b, material with high mechanical strength and a thermal expansion coefficient slightly higher than that of the monocrystal-silicon semiconductor substrate 2, for example, silicon nitride ($Si_3N_4$), can be used besides the above silicon nitride.

Moreover, the multi layer structure composed of silicon oxide layers whose thermal expansion coefficient is one tenth of that of the monocrystal-silicon semiconductor substrate 2, and silicon nitride layers with a thermal expansion coefficient slightly higher than that of the monocrystal-silicon semiconductor substrate 2, can be used, so as to match thermal expansion coefficients between the protection layer 8b and the substrate 2. Since the thermal stress between the protection layer 8b and the substrate 2, caused by temperature changes, can be reduced by adopting this multilayer structure, the strength of the sensor element 1 can be further improved.

In the next step, the region of the protection layer 8b, corresponding to the terminal electrodes 12 (12a, 12b, 12c, 12d, 12e, 12f, 12g, 12h) used for the connection between the sensor element 1 and the external circuit, are removed, and the terminal electrodes 12 are formed on the removed regions of the protection layer 8b, with aluminum, gold, etc.

Here, it is also possible to form the lead-connection stripes 11 with a multilayer structure composed of monocrystal-silicon semiconductor layers and metal layers made of aluminum, gold, etc.

In the last process, a masking film of a predetermined pattern, used for etching processing, is formed on the back face of the semiconductor substrate 2, and the cavity portion 9 is shaped by an anisotropic etching method using potassium hydroxide (KOH) etching liquid. Thus, the sensor element 1 of the heating element type mass air flow sensor of this embodiment has been fabricated.

By the way, in the above embodiments, one terminal of the heating resistor 4, and one terminal of the air temperature-sensing resistor 7, are directly connected to each other as shown in FIG. 6.

Further, in the resistance temperature-sensing elements 6a, 6b, 6c, and 6d, since they compose a bridge circuit, there are pairs of terminals in them, in which two terminals in each pair are directly connected to each other.

Therefore, in these embodiments, the terminal electrodes 12 are provided in the lead-connection stripes 11 formed inside the sensor element 1, commonly for each pair of directly connected terminals in the resistors as shown in FIG. 1.

For example, as shown in FIG. 1, the terminal electrode 12h is provided at the connection part in which the lead-connection stripe 11l extending from the one terminal of the heating resistor 4 is serially connected to the lead-connection stripe 11b extending from the one terminal of the air temperature-sensing resistor 7.

Further, the terminal electrode 12g is provided at the connection part in which the lead-connection stripe 11d extending from the one terminal of the upstream resistance temperature-sensing element 6a is serially connected to the lead-connection stripe 11k extending from the one terminal of the downstream resistance temperature-sensing element 6c; and the terminal electrode 12f is provided at the connection part in which the lead-connection stripe 11j extending from the other terminal of the resistance temperature-sensing element 6c is serially connected to the lead-connection stripe 11e extending from the one terminal of the upstream resistance temperature-sensing element 6b. In the same manner, the terminal electrode 12e is provided at the connection part in which the lead-connection stripe 11f extending from the other terminal of the resistance temperature-sensing element 6b is serially connected to the lead-connection stripe 11i extending from the one terminal of the downstream resistance temperature-sensing element 6d.

Therefore, according to the above embodiments, since the terminal electrodes can be used in common, and the number of terminal electrodes can be reduced, the area of a chip for the sensor element 1 can be decreased, which in turn increases the number of chips gained with one substrate wafer, and decreases the number of fabrication processes-such as processes in wire-bonding. Thus, the fabrication cost can remarkably be decreased.

Although the respective resistors are made of monocrystal-silicone semiconductor thin-film in the above embodiments, it is possible to use metal such as platinum, and both the types of resistors can bring the same effects.

Further, although the two pairs of resistance temperature-sensing elements 6a, 6b, 6c, and 6d, are arranged upstream and downstream of the heating resistance 4, respectively, it is possible to arrange one pair of resistance temperature-sensing elements upstream and downstream of the heating resistance 4. Also, the arrangement of one pair, and that of two pairs, can bring almost the same effects.

Furthermore, although the mass air flow sensor using the temperature difference-detecting method, in which the flow rate and the flow direction are measured, based on the temperature difference between resistance temperature-sensing elements arranged upstream and downstream of the heating resistance 4, is used in the above embodiments, it is possible in the present invention to use a mass air flow sensor using a direct thermal method, in which the flow rate is measured, based on the quantity of current flowing in the heating resistor 4. In this method also, by situating the heating resistor in the two-rotation symmetry manner, the temperature distribution in the cavity portion can be improved, and the response and the measurement accuracy, of the mass air flow sensor, can also be improved.

In accordance with the embodiments, since the temperature distribution in the electrical insulation layer, on which the sensor element is mounted, is properly adjusted, it has become possible to provide a heating element type mass air flow sensor with high measurement-accuracy.

What is claimed is:

1. A heating element type mass air flow sensor for measuring air flow-rate by using at least a heating resistor, situated on one side surface of an electrical insulation layer formed on a semiconductor substrate, covering a cavity portion shaped in said semiconductor substrate, wherein said heating resistor is arranged substantially in a straight line and is located in a direction substantially perpendicular to a direction of an air flow to be measured; and slits are shaped in said heating resistor; whereby current is passed through said heating resistor so as to heat said heating resistor and is divided at and by each of said slits into plural current flow in the same direction.

2. A heating element type mass air flow sensor according to claim 1, wherein said heating resistor has a structure such that a density of current flowing in the respective areas, in which said slits are shaped, is higher than the density of current flowing in other areas of said heating resistor.

3. A heating element type mass air flow sensor according to claim 1, wherein lead-connection portions are provided for connecting said heat resistor to an external circuit, and said heating resistor and lead-connection portions are formed with semiconductor film made of one of monocrystal silicon and polycrystal silicon, in which impurities are doped; and the concentration of said impurities in said heating resistor is lower than that of said lead-connection portions.

4. A heating element type mass air flow sensor according to claim 1, wherein said slits each are axially separated from an axial central portion of said heating resistor, and the density of the current flowing in said heating resistor is larger in the slit portions than in said central portion.

5. A heating element type mass air flow sensor for measuring air flow-rate by using at least a heating resistor, situated on one side surface of an electrical insulation thin-layer formed on a semiconductor substrate, covering a cavity portion shaped in said semiconductor substrate;

wherein a region in said electrical insulation thin-layer, said region just covering said cavity portion in said semiconductor substrate, is substantially a rectangle with the size w in the direction of said air flow, and the size D in the direction perpendicular to said air flow; and those sizes should satisfy the inequality: $D > 4W$.

6. A heating element type mass air flow sensor for measuring air flow-rate by using at least a heating resistor, situated on one side surface of an electrical insulation thin-layer formed on a semiconductor substrate, covering a cavity portion shaped in said semiconductor substrate; and at least one pair of resistance temperature-sensing elements separately arranged upstream and downstream of said heating resistor, respectively, on said electrical insulation thin-layer;

wherein a region of said electrical insulation thin-layer, said region just covering said cavity portion in said semiconductor substrate, is substantially a rectangle with the size w in the direction of said air flow, and the size D in the direction perpendicular to said air flow, and those sizes should satisfy the inequality: $D > 4W$; said heating resistor has the length L1, and said length L1 and said size D should satisfy the inequality: $D > 1.1 \times L1$; and each resistance temperature-sensing element has the length L2, and said length L2 and said length L1 should satisfy the inequality: $L1 > 1.05 \times L2$.

7. A heating element type mass air flow sensor according to claim 6, wherein lead-connection portions are provided for connecting said resistance temperature-sensing elements and said heating resistor to an external circuit, and said resistance temperature-sensing elements, said heating resistor and said lead-connection portions are formed with semiconductor film made of one of monocrystal silicon and polycrystal silicon, in which impurities are doped; and the concentration of said impurities in said heating resistor and said resistance temperature-sensing elements is lower than that of said lead-connection portions.

8. A heating element type mass air flow for measuring air flow-rate by using at least a heating resistor, situated on one side surface of an electrical insulation thin-layer formed on a semiconductor substrate, covering a cavity portion shaped in said semiconductor substrate; and at least one pair of resistance temperature-sensing elements separately arranged upstream and downstream of said heating resistor, respectively, on said electrical insulation thin-layer;

wherein a region of said electrical insulation thin-layer, said region just covering said cavity portion in said semiconductor substrate, is substantially a rectangle with the size w in the direction of said air flow, and the size D in the direction perpendicular to said air flow, and those sizes should satisfy the inequality: $D>4W$; said heating resistor has the length L1, and said length L1 and said size D should satisfy the inequality: $D>1.1\times L1$; and each resistance temperature-sensing element has the length L2, and said length L2 and said length L1 should satisfy the inequality: $L1>1.05\times L2$, wherein a terminal of said resistance temperature-sensing element located upstream of said heating resistor is, serially and alternately with respect to the top position and the bottom position of each element, connected to a terminal of said resistance temperature-sensing element located downstream of said heating resistor, at one of said lead-connection portions; and a connection electrode to be connected to an external circuit is formed in each lead-connection portion.

9. An internal combustion engine-control apparatus which measures the mass flow-rate of intake air, taken into an internal combustion engine, by using a heating element type mass air flow sensor for measuring air-flow rate by using at least a heating resistor, situated on one side surface of an electrical insulation layer formed on a semiconductor substrate, covering a cavity portion shaped in said semiconductor substrate, wherein said heating resistor is, substantially in a straight line, located in the direction substantially perpendicular to the direction of an air flow to be measured; slits are shaped in said heating resistor, and current is passed through said heating resistor so as to heat said heating resistor, the current being divided at and by each of said slits into plural flows having a same flow direction and controls the amount of fuel injected into said internal combustion engine.

10. An apparatus according to claim 9, wherein said heating resistor has a structure such as that the density of current flowing in the respective areas, in which said slits are shaped, is higher than the density of current flowing in other areas of said heating resistor.

11. An internal combustion engine-control apparatus which measures the mass flow-rate of intake air, taken into an internal combustion engine, by using a heating element type mass air flow sensor for measuring air flow-rate by using at least a heating resistor, situated on one side surface of an electrical insulation layer formed on a semiconductor substrate, covering a cavity portion shaped in said semiconductor substrate, wherein a region in said electrical insulation thin-layer, said region just covering said cavity portion in said semiconductor substrate, is substantially a rectangle with the size w in the direction of said air flow, and the size D in the direction perpendicular to said air flow, and those sizes should satisfy the inequality: $D>4W$, and controls the amount of fuel injected into said internal combustion engine.

12. An internal combustion engine-control apparatus which measures the mass flow-rate of intake air, taken into an internal combustion engine, by using a heating element type mass air flow sensor for measuring air flow-rate by using at least a heating resistor, situated on one side surface of an electrical insulation layer formed on a semiconductor substrate, covering a cavity portion shaped in said semiconductor substrate, and at least one pair of resistance temperature-sensing elements separately arranged upstream and downstream of said heating resistor, respectively, on said electrical insulation thin-layer, wherein a region of said electrical insulation thin-layer, said region just covering said cavity portion in said semiconductor substrate, is substantially a rectangle with the size w in the direction of said air flow, and the size D in the direction perpendicular to said air flow, and those sizes should satisfy the inequality: $D>4W$, said heating resistor has the length L1, and said length L1 and said size D should satisfy the inequality: $D>1.1\times L1$, and each resistance temperature-sensing element has the length L2, and said length L2 and said length L1 should satisfy the inequality: $L1>1.05\times L2$, and controls the amount of fuel injected into said internal combustion engine.

13. A heating element type mass air flow sensor for measuring air flow-rate, comprising:

a semiconductor substrate having therein a cavity portion having a substantially rectangular shape;

a heating resistor situated on one side surface of an electrical insulation layer formed on said semiconductor substrate and covering said cavity portion, said heating resistor being shaped in a straight line within a region of said electrical insulation layer and arranged to be in parallel to a long side of the rectangular shape of said cavity portion; and at least one pair of resistance temperature-sensing elements separately arranged on said electrical insulation layer upstream and downstream of said heating resistor, respectively, with respect to air flow, each of said pair of resistance temperature-sensing elements being elongated along said heating element, wherein a substantial heating portion of said heating resistor and substantial temperature-sensing portions of said pair of resistance temperature-sensing elements are situated within a region of said electrical insulation layer and correspond to said cavity portion of rectangular shape having a size W in the direction of said air flow and a size D in the direction perpendicular to said air flow, whereby D is larger than 4W.

14. A heating element type mass air flow sensor according to claim 13, wherein said substantial heating portion hash a length L1 whereby $D>1.1\times L1$, and said substantial temperature sensing portions each have a length L2 whereby $L1>1.05\times L2$.

15. A heating element type mass air flow sensor according to claim 13, wherein said heating resistor has slits each formed therein and axially separated from an axial central portion of said heating resistor such that the density of the current flowing in said heating resistor is larger in the slit portions than in said central portion.

16. A heating element type mass air flow sensor according to claim 14, wherein said heating resistor has slits each formed therein and axially separated from an axial central portion of said heating resistor such that the density of the current flowing in said heating resistor is larger in the slit portions than in said central portion.

* * * * *